United States Patent [19]

Clark et al.

[11] Patent Number: 5,232,885
[45] Date of Patent: Aug. 3, 1993

[54] PROCESS FOR REGENERATING A SPENT RESID HYDROPROCESSING CATALYST USING A GROUP IV METAL

[75] Inventors: Frederick T. Clark, Wheaton; Mary C. Springman, Naperville, both of Ill.

[73] Assignee: Amoco Corporation, Chicago, Ill.

[21] Appl. No.: 812,131

[22] Filed: Dec. 18, 1991

[51] Int. Cl.$^5$ .............. B01J 23/94; B01J 38/64; B01J 38/20; C10G 45/08
[52] U.S. Cl. .............. 502/25; 208/216 R; 208/251 H; 208/52 CT; 502/22; 502/31; 502/49; 502/521
[58] Field of Search ............ 502/25, 22, 521, 308–310, 502/31, 49; 208/52 CT, 251 H

[56] References Cited

U.S. PATENT DOCUMENTS

| | | | |
|---|---|---|---|
| 3,840,473 | 10/1974 | Beuther | 502/30 F |
| 3,968,028 | 7/1976 | Frayer et al. | 208/251 H |
| 3,985,684 | 10/1976 | Arey, Jr. et al. | 502/30 F |
| 4,557,823 | 12/1985 | Kukes et al. | 208/251 H |
| 4,734,186 | 3/1988 | Parrot et al. | 208/251 H |
| 4,994,423 | 2/1991 | Clark et al. | 502/25 |

Primary Examiner—Paul E. Konopka
Attorney, Agent, or Firm—Thomas A. Yassen; Richard A. Kretchmer; Frank J. Sroka

[57] ABSTRACT

A method of regenerating a contaminant metal-containing, coke deactivated, molecular sieve-free catalyst having at least one hydrogenation metal and at least one Group IV metal deposited on an inorganic oxide support comprising contacting the catalyst with an oxygen-containing gas under conditions sufficient to remove a substantial amount of the coke from the catalyst.

9 Claims, 5 Drawing Sheets

PROCESS FOR REGENERATING A SPENT RESID HYDROPROCESSING CATALYST USING A GROUP IV METAL

BACKGROUND OF THE INVENTION

The United States and Canada generate about 100,000,000 pounds of spent base-metal catalyst per year, about half of which is spent hydroprocessing catalysts. The present invention relates to a process for regenerating spent, heavy hydrocarbon, hydroprocessing catalysts. More specifically, the present invention relates to a process for regenerating spent, heavy hydrocarbon, hydroprocessing catalysts that have been deactivated with coke and metal deactivants such as nickel and vanadium.

With respect to the present invention, the term hydroprocessing is used to refer to a process for hydrodemetallation, hydrodesulfurization, hydrodenitrogenation, and hydroconversion wherein the term hydroconversion encompasses the hydrocracking and hydrotreating of hydrocarbon streams containing asphaltenes and contaminant metals. Hydroprocessing catalysts used to treat heavy hydrocarbon streams, such as resids, are deactivated as a result of metals deposition and coke deposition. These deposition materials modify the rate of reaction as well as accelerate the rate of catalyst deactivation. The various metal deposits tend to occlude catalyst pores and poison the hydroprocessing catalyst, while coke deposits similarly reduce pore size and surface area of the hydroprocessing catalyst.

Typically, hydroprocessing catalysts possess substantial macropore volume in order to effect metals removal from heavy hydrocarbon feed streams. Heavy hydrocarbon, hydroprocessing catalysts possess the capacity to adsorb contaminant metals, such as nickel and vanadium, in an amount ranging up to about 100 wt. % of the fresh catalyst weight. However, due to the rapid coke deposition rate, the catalyst is deactivated prior to achieving its full metals adsorption capacity. Such catalyst are taken out of service when they contain as little as 10 wt. % nickel plus vanadium.

Thus, the prior art is replete with processes suitable for handling these spent catalysts. These processes can be separated into four areas: (1) disposal, (2) total catalyst reclamation, (3) catalyst rejuvenation, and (4) catalyst regeneration.

Disposal of spent catalyst requires compliance with stringent environmental standards that can substantially increase the cost of handling spent catalyst. One acceptable method of disposal of spent catalyst is encapsulation, wherein the catalyst is surrounded, either as a pellet or in bulk, with an impervious layer of sealant. Bitumen, paraffin wax and polyethylene have been used as thermoplastic encapsulating agents in which the dry waste is mixed with the sealant at high temperature and cooled. Similar methods have been developed for low temperature encapsulation, where polybutadiene binder can be mixed with the catalyst followed by application of a thin polyethylene jacket around the mass. Although encapsulation provides a relatively effective means of disposing of spent catalyst, the possibility of fire and weathering can lead to long term instability of the encapsulants. In addition, care must be taken to avoid shear stresses that can break open encapsulated particles.

Total catalyst reclamation involves removing both the contaminant and catalytic metals from the spent catalyst to recover as precious metals. The use of catalyst as a source of precious metals is well known in the industry. Most metal recovery methods involve roasting the spent catalyst with or without the presence of additives, followed by leaching of the catalyst. A suitable method of recovering precious metals from spent catalyst is presented in G. Parkinson, "Recyclers Try New Ways to Process Spent Catalyst," *Chemical Engineering*, Feb. 16, 1987, pp. 25-31. This reference discloses a Gulf Chemical and Metallurgical Corporation metal recovery method wherein molybdenum and vanadium are converted to their sodium salts by adding sodium carbonate during a multiple-hearth roast at 650°-900° C. This roast removes carbon and sulfur. Calcined material is then quenched in water which dissolves the salts. A leach liquor is then separated from the insolubles by countercurrent decantation. Later, ammonium chloride is added to precipitate ammonium vanadate, which is calcined and fused to produce vanadium pentoxide. The remaining solution is then heated to 80°-85° C. and acidified to precipitate molybdic acid, which is calcined to molybdic oxide. Other examples of metal recovery techniques are disclosed in Trimm, D. L., "Deactivation, Regeneration, and Disposal of Hydroprocessing Catalysts," *Catalyst in Petroleum Refining* 1989, Elsevier Science Publishers, B. V. Amsterdam (1990).

Catalyst rejuvenation involves selective removal of contaminant metals from the spent catalyst followed by or preceded by oxidative decoking of the coke deposited on the catalyst. The objective in catalyst rejuvenation is to remove the contaminant metals while leaving the catalytic metals and to reuse the catalyst rather than to reclaim the metals or dispose of the catalyst entirely. One way of achieving selective removal of contaminant metals, in particular vanadium, is by attrition. It is well known that vanadium and iron are deposited on the exterior of some catalyst. As a result, subjecting the outermost layers of the catalyst to abrasion leads to a powder rich in coke, vanadium and iron, while the residual pellet contains catalytic material and nickel (which is deposited throughout the pellet). Although some improvement in activity is observed, the overall benefit is not high because abrasion of the exterior deposits still leaves vanadium that is deposited in the pore mouths of the catalyst. Deeper abrasion to remove pore-mouth deposits can weaken the catalyst. Another approach for selectively removing contaminant metals from the spent catalyst is selective leaching which takes advantage of the fact that metals on the spent catalyst are usually present as sulfides. Selective leaching involves treating the spent hydroprocessing catalyst with a chemical that reacts with only one of these sulfides, e.g. the use of oxalic acid to remove vanadium. An extensive discussion of the use of leaching to selectively remove metals from spent hydroprocessing catalyst can be found in M. Marafi, A. Stanislaus, C. J. Mumford, and M. Fahim, "Regeneration of Spent Hydroprocessing Catalyst: Metal Removal," *Applied Catalysis*, 47(1989) pp. 85-96.

The problem with these so-called selective removal processes is, invariably, some of the catalytic metals are also removed, thereby requiring that at least a portion of the catalytic metals be reincorporated onto the catalyst prior to reuse. The problems associated with selective removal of contaminant metals have lead some operators in the industry to catalytically regenerate the spent catalyst. In other words, the spent, metal-containing hydroprocessing catalyst is decoked using oxidative combustion, but the contaminant and catalyst metals are left behind until the metals build-up is so severe that the catalyst needs to be replaced. Regeneration takes into account that deactivation due to coking occurs much more rapidly than deactivation due to metal deposition. In addition, the catalyst's demetallation capacity is more fully utilized, thereby increasing its eventual reclamation value.

The problem with decoking in the presence of contaminant metals, in particular vanadium, is that the catalyst becomes soft, i.e., the catalyst's resistance to attrition is significantly reduced. This problem is particularly severe when the catalyst is employed in an ebullated bed where the solid catalyst particles are kept in random motion by the upward flow of liquid and gas. This random motion makes the attrition resistance of the catalyst a very important property. It is believed that when a spent, metal-containing, hydroprocessing catalyst is subjected to oxidative combustion, one of the species oxidized is the $V_3S_4$ sulfide, the predominant vanadium phase deposited under typical hydrotreating conditions. The sulfide is then converted to vanadium pentoxide ($V_2O_5$). Water formed during the combustion step reacts with the pentoxide to form vanadic acid, $VO(OH)_3$, a volatile and highly reactive species that reacts with metals present in the catalyst such as iron, nickel, aluminum or molybdenum to form mixed metal vanadates. These vanadates cause loss of both catalyst surface area and attrition resistance.

The use of passivating agents such as tin and titanium to reduce the detrimental effects of contaminant metal-containing hydrocarbon feedstocks on cracking catalyst is well known in the art. U.S. Pat. Nos. 4,326,990 and 4,255,287 disclose contacting a cracking catalyst with an agent containing tin and antimony prior to contacting the catalyst with a contaminant metal-containing hydrocarbon feedstock. U.S. Pat. No. 4,324,648 discloses treating a cracking catalyst with agent containing tin, phosphorous, and sulfur prior to contacting the catalyst with a contaminant metal-containing hydrocarbon feedstock. U.S. Pat. No. 2,886,513 is directed to employing titanium chloride togethre with calcium oxide to obtain a catalytic cracking catalyst which is effective to produce a more olefinic product than other catalytic cracking catalysts. U.S. Pat. No. 4,496,665 discloses continuous addition of a titanium additive to a cracking catalyst employed in conversion of contaminant metal-containing hydrocarbon feedstocks to promote matrix cracking of large molecules. U.S. Pat. No. 3,696,025 discloses adding titanium to a cracking catalyst during the catalytic cracking process and subsequently regenerating the cracking catalyst to increase the $CO_2/CO$ ratio in the regeneration effluent.

Since the early 1960's, cracking catalysts have predominately consisted of molecular sieves incorporated into an amorphous matrix of silica, alumina, silica-alumina, kalin, clay or the like. Such catalysts were 1,000–10,000 times more active than previous amorphous silica-alumina catalysts due to their acidity. These molecular sieve-containing catalysts are not suitable for use in resid hydrotreating because their high activities promote coke formation and their relative high micropore volumes promote pore mouth plugging of the catalyst.

SUMMARY OF THE INVENTION

The present invention is a method of regenerating a contaminant metal-containing, coke-deactivated, molecular sieve-free catalyst having at least one hydrogenation metal and at least one Group IV metal deposited on an inorganic oxide support comprising the step of contacting said catalyst with an oxygen-containing gas under conditions sufficient to remove a substantial amount of said coke from said catalyst. The presence of the Group IV metal on the catalyst during regeneration has been found to increase the attrition resistance of catalyst during regeneration.

In one embodiment, the present invention is a method of regenerating a molecular sieve-free catalyst comprising at least one hydrogenation metal and at least one Group IV metal deposited on an inorganic oxide support comprising the steps of: after incorporating said Group IV metal onto said catalyst, contacting said catalyst with a contaminant metal-containing hydrocarbon feedstream at conditions sufficient to deposit at least one contaminant metal and coke onto said catalyst to produce a coke-deactivated, contaminant metal-containing, molecular sieve-free catalyst; and contacting said catalyst with an oxygen-containing gas at oxidation conditions sufficient to remove a substantial amount of said coke from said catalyst.

In another embodiment, the present invention is a method for regenerating a contaminant metal-containing, molecular sieve-free catalyst, comprising the steps of: partially decoking said catalyst in an initial coke-burning step wherein said catalyst is contacted with an oxygen-containing gas at a temperature of about 400°–700° F.; incorporating a Group IV metal onto said partially decoked catalyst such that the partially decoked catalyst contains about 0.1 to about 20.0 wt. % of said Group IV metal calculated as the oxide and based on the fresh weight of said catalyst; and decoking said partially decoked, Group IV metal-containing catalyst in a final coke-burning step wherein said catalyst is contacted with an oxygen-containing gas at a temperature of about 600° F. to about 1400° F., thereby removing a substantial amount of said coke.

In another embodiment, the present invention is a catalyst consisting essentially of at least one hydrogenation metal, at least one Group IV metal, and a molecular sieve-free inorganic oxide support.

In another embodiment, the present invention is a catalyst made by the process comprising: incorporating a Group IV metal onto a catalyst comprising at least one hydrogenation metal deposited in a molecular sieve-free inorganic oxide support; contacting said catalyst with a contaminant metal-containing hydrocarbon feedstream at conditions sufficient to deposit at least one contaminant metal and coke onto said catalyst to produce a coke-deactivated, contaminant metal-containing, molecular sieve-free catalyst; and contacting said catalyst with an oxygen-containing gas at conditions sufficient to remove a substantial amount of said coke from said catalyst.

DETAILED DESCRIPTION OF THE PREFERRED EMBODIMENT

Figure 1:
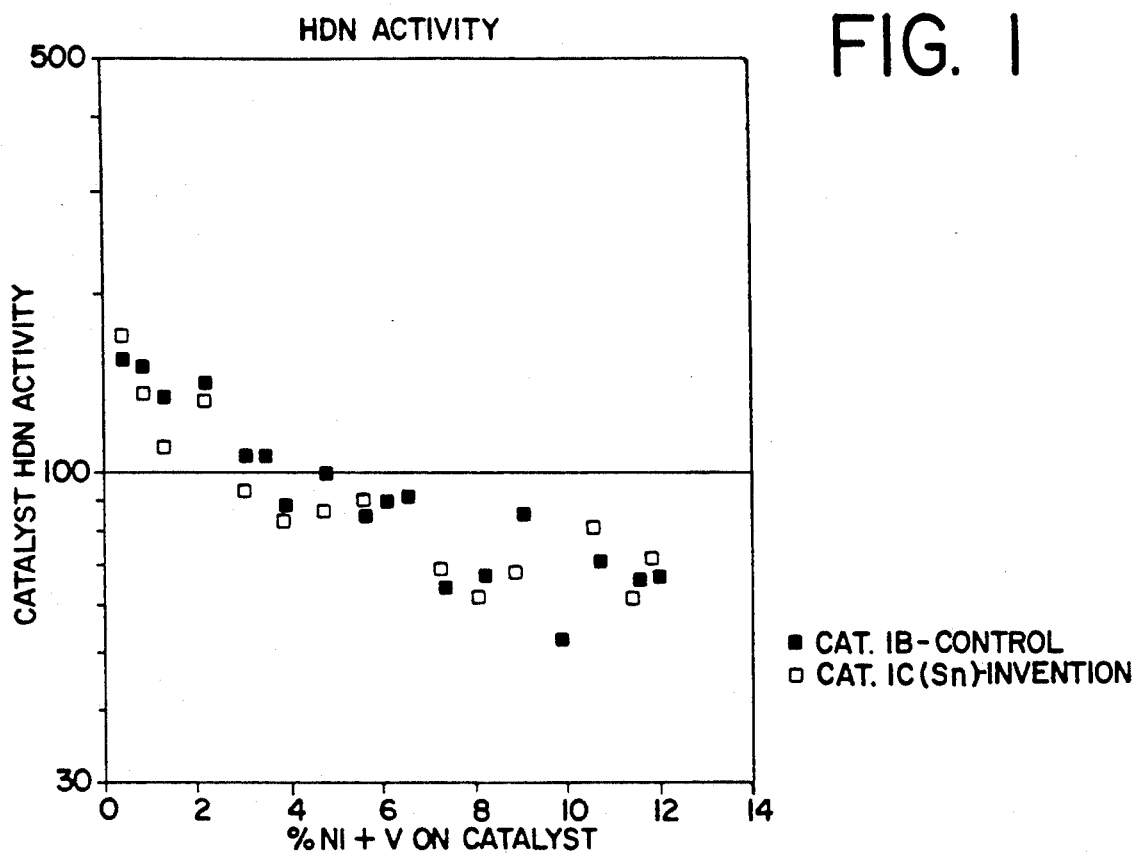
FIGS. 1 through 4 depict plots of denitrogenation activity, desulfurization activity, Ramscarbon removal activity, and devanadation activity, respectively, versus weight percentage accumulation of nickel plus vanadium for both comparative and invention catalysts tested in Example 1.
Figure 2:
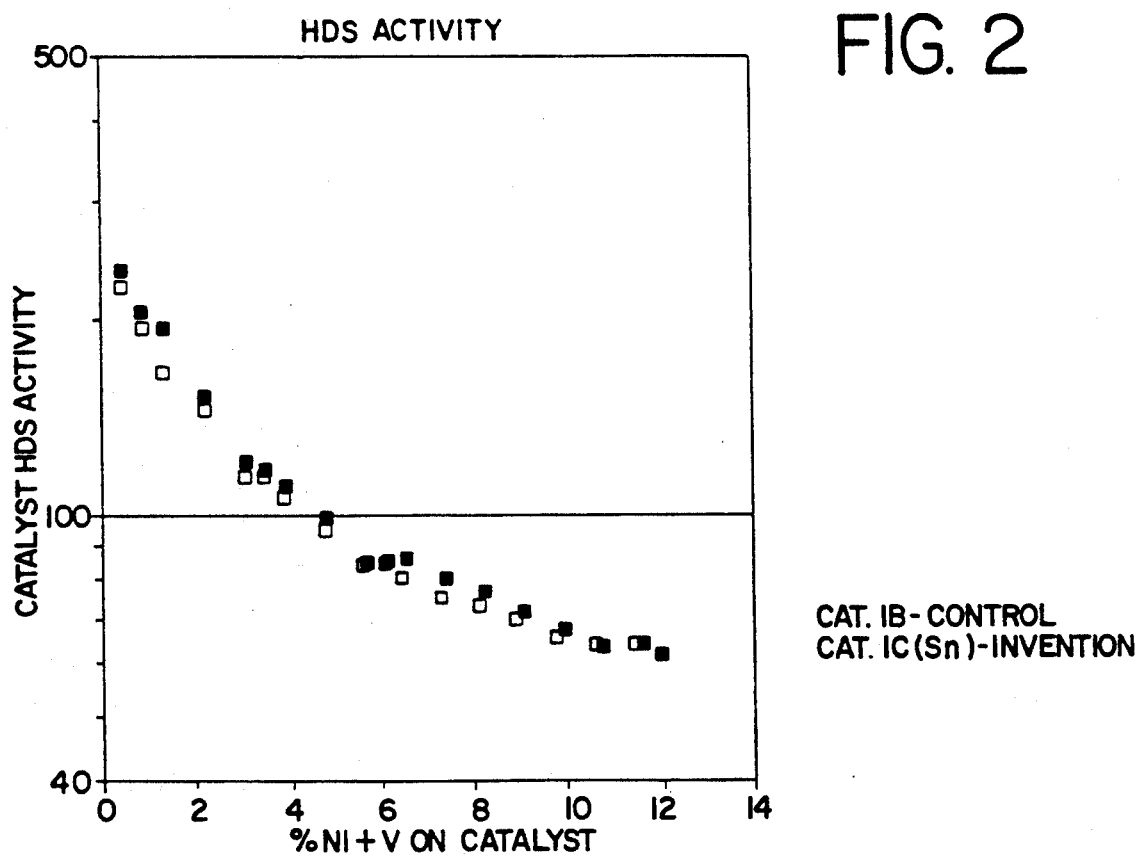
Figure 3:
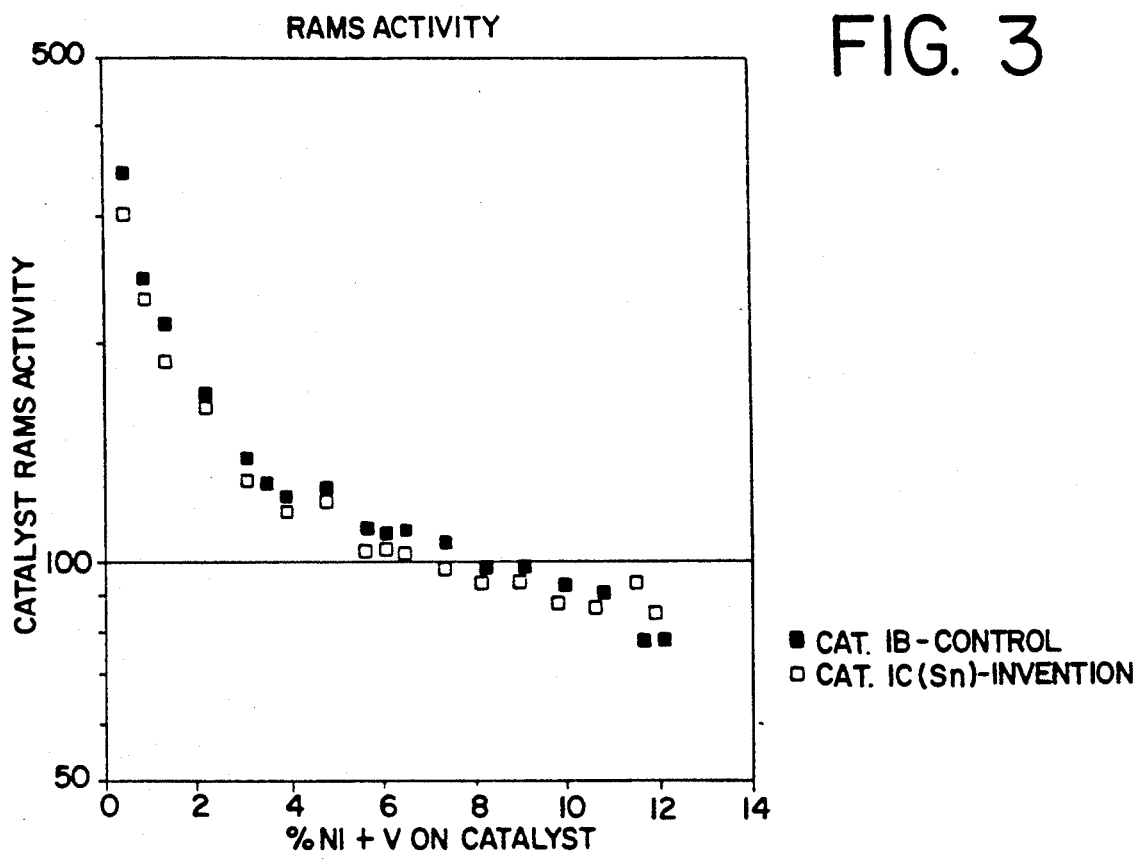
Figure 4:
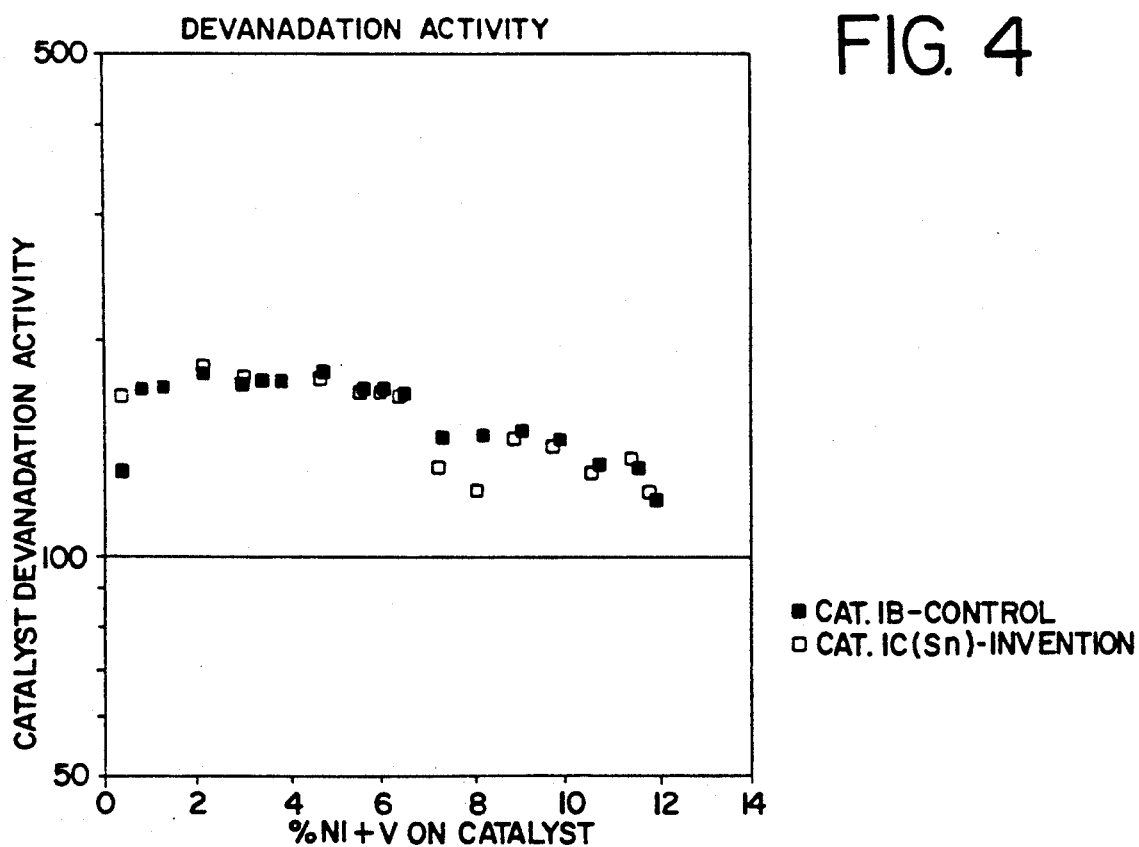
Figure 5:
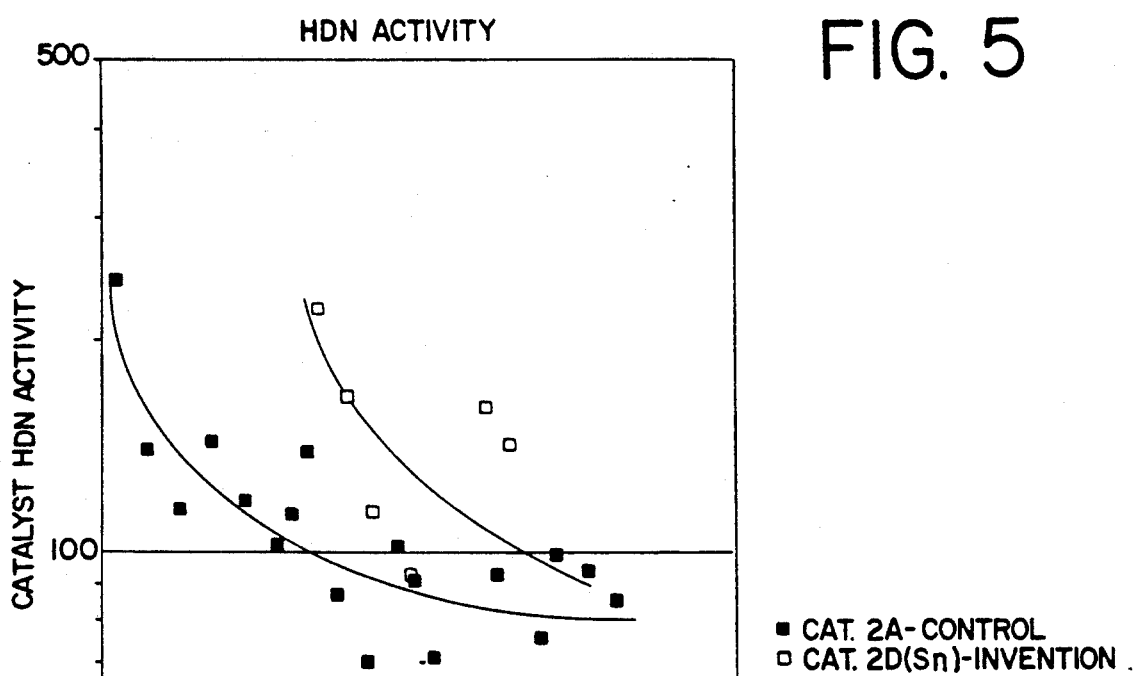
FIGS. 5 through 8 depict plots of denitrogenation activity, desulfurization activity, Ramscarbon removal activity, and devanadation activity, respectively, versus weight percentage accumulation of nickel plus vanadium for both comparative and invention catalysts tested in Example 2.
Figure 6:
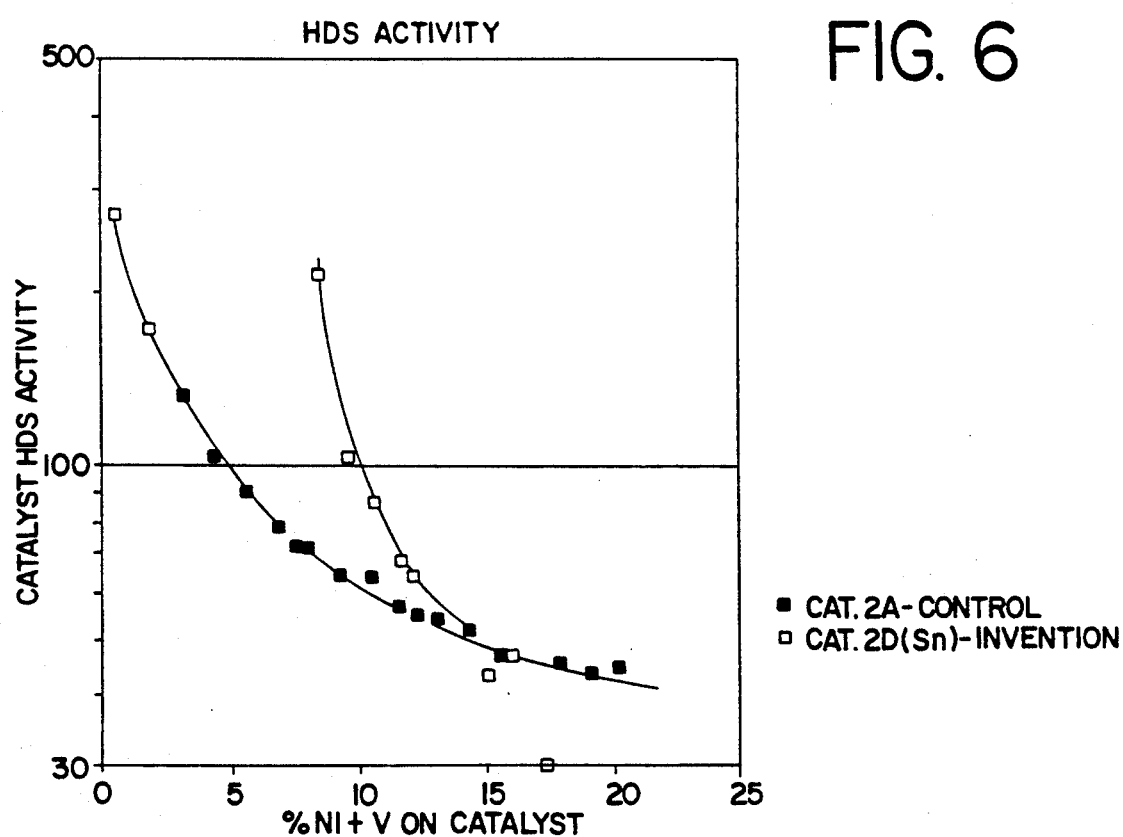
Figure 7:
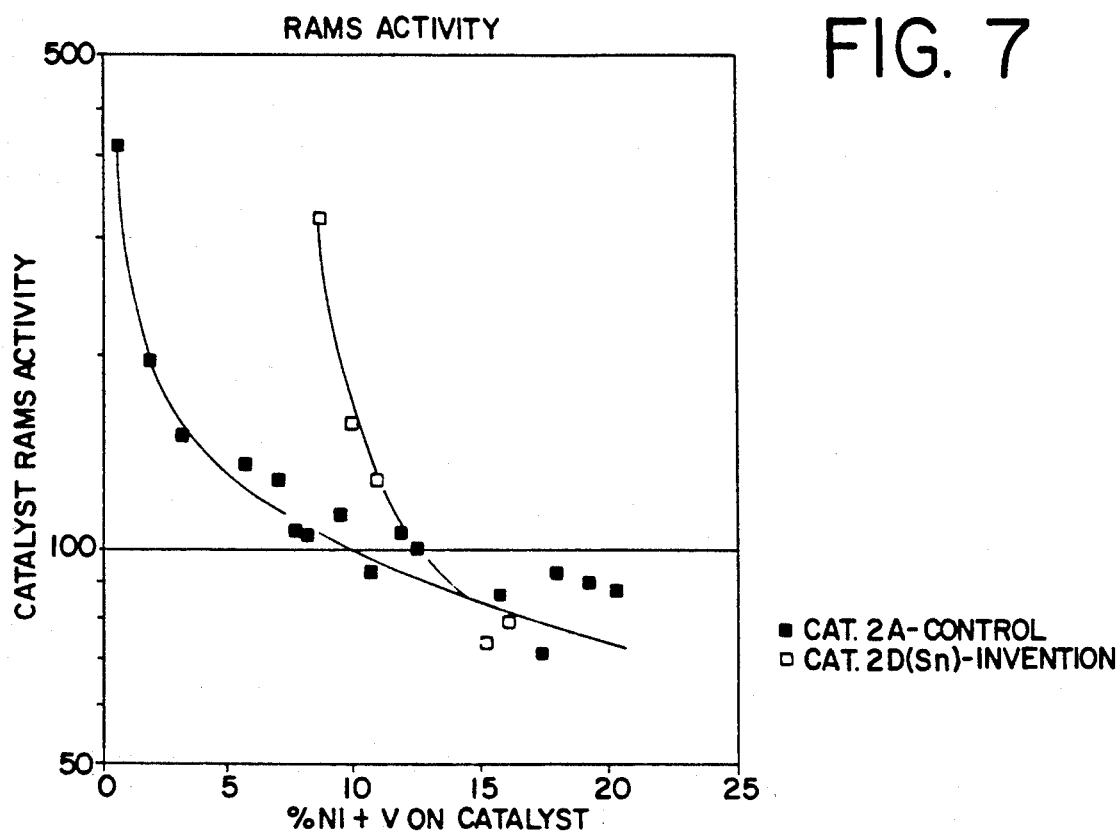
Figure 8:
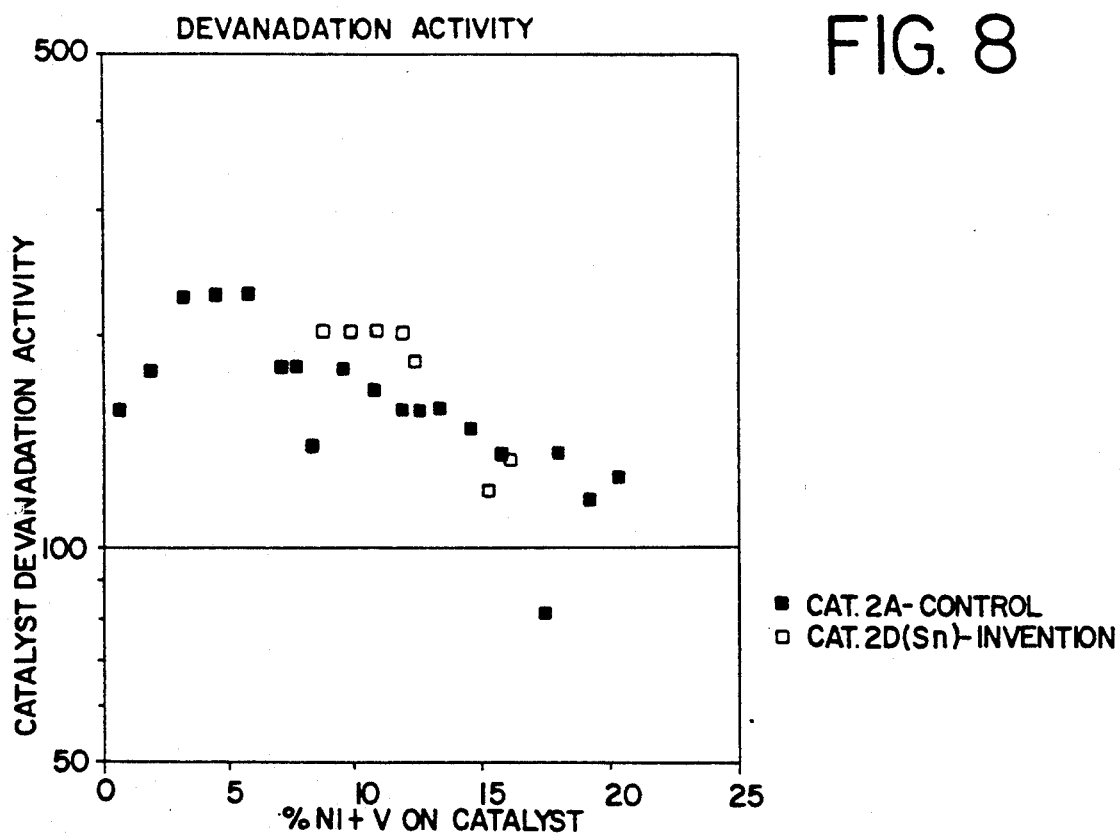

Broadly, the present invention is directed to the regeneration of catalyst used in the hydroprocessing of contaminant metal-containing heavy hydrocarbon feedstream. The catalyst of the present invention has a molecular sieve-free, inorganic oxide support, at least one hydrogenation metal, and at least one Group IV metal.

The hydrogenation metal can be at least one Group VIII metal, a Group VIB metal, or mixtures thereof. The Group VIII and Group VIB classifications of the Periodic Table of Elements can be found on page 628 of Webster's Seventh New Collegiate Dictionary, G & C. Merriam Company, Springfield, Mass., U.S.A. (1965). The Group VIII metal can be present in an amount ranging from about 0.4 to about 4.0 wt. % calculated as an oxide and based on total catalyst weight. The preferred Group VIII metals are cobalt and nickel. The Group VIB metal can be present at a composition of about 3.0 to about 20 wt. % of the Group VIB metal calculated as an oxide and based on the total catalyst weight. The preferred Group VIB metal is molybdenum. Preferably, the cobalt and nickel are present in an amount such that the CoO or NiO to Group VIB metal oxide weight ratio varies from about 0.1 to about 0.3.

The addition of a Group VIII metals to the catalyst is especially useful when ebullated-bed reactors are employed. In a fixed-bed reactor, the activity of the catalyst dissipates over time, whereas in the ebullated-bed reactor fresh amounts of catalyst are continuously or intermittently added. It has also been discovered that relatively small amounts of cobalt present in a hydroprocessing catalyst can provide excellent hydroprocessing activity in an ebullated-bed system. This low cobalt-containing hydroprocessing catalyst is disclosed and claimed in U.S. Pat. No. 4,657,665. This low cobalt-containing catalyst also has a Group VIB metal present in an amount ranging from about 3.5 to 5.0 wt. % calculated as an oxide and based on total catalyst weight. The cobalt is present in an amount ranging from about 0.4 to about 0.8 wt. % as calculated as an oxide and based on total catalyst weight.

While calculated as the oxide, the hydrogenation metal components of the catalyst of the present invention can be present as an element, as an oxide thereof, as a sulfide thereof, or mixtures thereof.

The hydrogenation metals can be deposited on a molecular sieve-free, porous, inorganic oxide support such as alumina, aluminum phosphate, or silica alumina.

Group IV metal is defined as Ge, Sn, Pb, Ti, Zr, and Hf. The preferred Group IV metals are Sn and Ti, The Group IV metal can be incorporated on the support by impregnation using aqueous or hydrocarbon based solutions that contain the Group IV metals as salts, including, but not limited to, nitrates, sulfates, sulfites, acetates, benzoates, halides, carbonates, oxyhalides, hydrochloroxides, oxalates, alkoxides, and thiosulfates. The impregnation solution contains a sufficient amount of Group IV metal such that the impregnated catalyst contains from about 0.1 to about 20 wt. % of the Group IV metal calculated as the oxide and based on the total weight of the fresh catalyst. In one embodiment, the impregnating solution contains a sufficient amount of Group IV metal to result in an impregnated catalyst containing 0.5 to 8 wt. % Group IV metal calculated as the oxide and based on the total weight of the fresh catalyst. In another embodiment, the catalyst of the present invention contains about 0.5 to 4.0 wt. % Group IV metal calculated as the oxide and based on the total weight of the fresh catalyst.

The Group IV metal can be incorporated onto the catalyst before, during, or after addition of hydrogenation metals.

The hydrotreating catalyst regenerated in accordance with the process of the present invention can be prepared by the typical commercial method of impregnating a large-pore, high-surface area, inorganic oxide support or any other method known to those skilled in the art. Appropriate commercially available alumina, preferably calcined at about 800°–1,600° F. (426°–872° C.) for about 0.5 to about 10 hours, can be impregnated to provide a suitable surface area ranging from about 75 $m^2/g$ to about 400 $m^2/g$ and a total pore volume within the range of about 0.5 cc/g to about 1.5 cc/g. Preferably, the surface area ranges from about 150 $m^2/g$ to about 350 $m^2/g$, with a total pore volume of about 0.6 cc/g to about 1.2 cc/g. The catalysts most suitably regenerated in accordance with the present invention contain a pore volume of pores having a diameter greater than 1,200 Angstroms of at least 0.05 cc/g, preferably at least 0.1 cc/g, and optimally from about 0.15 to about 0.3 cc/g.

An inorganic oxide is used as a support to provide a foundation upon which the catalytic metals can be deposited. The support can be a naturally or synthetically produced inorganic oxide or a combination of both. Typical porous refractory inorganic oxide supports which can be used include, but are not limited to, clays, alumina, silica, and silica-aluminas.

The porous refractory inorganic oxide, e.g., alumina, can be impregnated with a solution, usually aqueous, containing a heat-decomposable compound of the metal to be placed on the catalyst, drying, and calcining the impregnated material. If the impregnation is to be performed with more than one solution, it is understood that the metals may be applied in any order. The drying can be conducted in air at a temperature of about 80° F. (27° C.) to about 350° F. (177° C.) for a period of 0.1 to 24 hours. Typically, the calcination can be carried out at a temperature of about 800° F. (426° C.) to about 1,200° F. (648° C.) for a period of from 0.5 to 16 hours.

Alternatively, the inorganic oxide support can be prepared by mixing a sol, hydrosol, or hydrogel of the inorganic oxide with a gelling medium, such as ammonium hydroxide followed by constant stirring to produce a gel which is subsequently dried, pelleted or extruded, and calcined. The hydrogen metal(s) can then be incorporated into the support as described above or incorporated during the gelling step.

While the hydroprocessing catalyst regenerated in accordance with the present invention can be present in the form of pellets, spheres, or extrudates, other shapes are also contemplated, such as clover-leaf shape, cross-shape, or C-shape as disclosed in U.S. Pat. Nos. 3,674,680 and 3,764,565 (Hoekstra, et al.).

Although processes for the hydroprocessing of heavy hydrocarbon streams are known, the use of fixed-bed catalytic processes to convert such feedstocks without appreciable asphaltene precipitation and reactor plugging and with effective removal of metals and other contaminants, such as sulfur compounds and nitrogen compound, is not common because the catalysts employed have not generally been capable of maintaining activity and performance. Thus, the subject hydrotreating processes are most effectively carried out in an ebullated-bed system. In an ebullated bed, preheated hydrogen and resid enter the bottom of a reactor wherein the upward flow of resid plus and internal recycle suspend the catalyst particles in the liquid phase. Roughly about 1 wt. % of the catalyst inventory is replaced each day with fresh catalyst to maintain activity in an ebullated-bed system. Thus, the overall system activity is the weighted average activity of catalyst varying from fresh to very old, i.e., deactivated.

In any event, an ebullated bed typically has a gross volume of at least 10 percent greater and up to 70 percent greater than the solids thereof in a settled state. The required ebullation of the catalyst particles is maintained by introducing the liquid feed, inclusive of recycle, if any, to the reaction zone at linear velocities ranging from about 0.02 to about 0.4 feet per second and preferably, from about 0.05 to about 0.20 feet per second.

Hydrocarbon feed streams suitable for use in the present invention include heavy hydrocarbon feedstocks which contain asphaltenes, Shell hot filtration solids precursors, metals, nitrogen compounds, and sulfur compounds. As is well known, these feedstocks contain nickel and vanadium, and asphaltenes, e.g., about 40 ppm up to more than 1,000 ppm for the combined total amount of nickel and vanadium, and up to about 25 wt. % asphaltenes. A typical sulfur content for such a feedstream can range from about 1-10 wt %. Such feed streams typically contain a substantial amount of components that boil appreciably above 1,000° F. Examples of typical feedstocks are crude oils, topped crude oils, petroleum hydrocarbon residua, both atmospheric and vacuum residua, oils obtained from tar sands and residua derived from tar sand oil, and hydrocarbon streams derived from coal.

The operating conditions for the hydroprocessing of heavy hydrocarbon streams, such as petroleum hydrocarbon residua and the like, comprise a hydrogen partial pressure within the range of about 1,000 psia (68 atm) to about 3,000 psia (204 atm), an average catalyst bed temperature within the range of about 700° F. (371° C.) to about 850° F. (454° C.), a liquid hourly space velocity (LHSV) within the range of about 0.1 volume of hydrocarbon per hour per volume of catalyst to about 5 volumes of hydrocarbon per hour per volume of catalyst, and a hydrogen recycle rate or hydrogen addition rate within the range of about 2,000 standard cubic feet per barrel (SCFB) (356 m$^3$/m$^3$) to about 15,000 SCFB (2,671 m$^3$/m$^3$). Preferably, the operating conditions comprise a hydrogen partial pressure within the range of about 1,200 psia to about 2,800 psia (81-190 atm); an average catalyst bed temperature within the range of about 730° F. (387° C.) to about 820° F. (437° C.); and a LHSV within the range of about 0.15 to about 2; and a hydrogen recycle rate or hydrogen addition rate within the range of about 2,500 SCFB (445 m$^3$/m$^3$) to about 5,000 SCFB (890 m$^3$/m$^3$).

The regenerated catalyst of the present invention can to be used to treat hydrocarbon distillates. The operating conditions comprise a hydrogen partial pressure within the range of about 200 psia (13 atm) to about 3,000 psia (204 atm); an average catalyst bed temperature within the range of about 600° F. (315° C.) to about 850° F.; a LHSV within the range of about 0.1 volume of hydrocarbon per hour per volume of catalyst to about 6 volumes of hydrocarbon recycle rate of hydrogen addition rate within the range of about 1,000 SCFB (178 m$^3$/m$^3$) to about 10,000 SCFB (1,381 m$^3$/m$^3$). Preferred operating conditions for the hydroprocessing of hydrocarbon distillates comprise a hydrogen partial pressure within the range of about 200 psia (13 atoms) to about 2,000 psia; an average catalyst bed temperature within the range of about 600° F. (315° C.) to about 800° F.; a LHSV within the range of about 0.1 volume of hydrocarbon per hour per volume of catalyst to about 2 volumes of hydrocarbon per hour per volume of catalyst; and a hydrogen recycle rate or hydrogen addition rate within the range of about 1,000 SCFB (178 m$^3$/m$^3$) to about 6,000 SCFB (1,068 m$^3$/m$^3$). Generally, the process temperatures and space velocities are selected so that at least 30 vol. % of the feed fraction boiling above 1,000° F. and more preferably so that at least 60 vol. % of the subject fraction is converted to a product boiling below 1,000° F.

At some point in time, after contacting the catalyst of the present invention with such a hydrocarbon feedstream, metal deposition and coke formation occurs. The metals deposited on the catalyst are the so-called contaminant metals, e.g., nickel, vanadium, and iron. A contaminant metalcontaining catalyst is defined as a catalyst having a total contaminant metals build-up of at least about 4 wt. % nickel and vanadium based on the fresh catalyst weight. A coke-deactivated catalyst is defined as a catalyst having a carbon content of about 10-60 wt. % based on the total fresh catalyst weight. The relative amounts of metals and coke present in deactivated catalyst is dependent upon the relative upstream or downstream position of the catalyst in the reactor while it is in use. The upstream catalyst would contain more metals, while the downstream catalyst would contain more coke.

In accordance with the regeneration process of the present invention a Group IV metal-containing, hydrogenation metal-containing, contaminant metal-containing, coke-deactivated catalyst with an oxygen-containing gas at conditions sufficient to remove a substantial amount of the coke. The oxygen-containing gas can have an oxygen content of about 1-21 mole %. Substantial is defined as greater than about 75 wt. %, preferably greater than about 85 wt. %, most preferably greater than about 95 wt. %. Conditions suitable for removing a substantial amount of the coke include an oxidation temperature of about 400°-1400° F. and oxidation a period of about 1-12 hours. In a preferred embodiment, the Group IV metal is incorporated onto the catalyst prior to the deposition of the contaminant metals and coke, i.e., a fresh catalyst that is essentially coke-free and contaminant metal-free. Coke-free is defined as a carbon content of less than about 0.1 wt. %, based on the fresh catalyst weight. Contaminant metal-free is defined as a nickel and vanadium content of less than 0.1 wt. %, based on the fresh catalyst weight.

In another embodiment, the Group IV metal is incorporated onto the catalyst after the deposition of contaminant metals and coke and after the catalyst has been partially decoked. In this embodiment, the contaminant metal-containing, coke deactivated catalyst is initially subjected to a partial decoking or oxidation step wherein the catalyst is contacted with an oxygen-containing gas at a temperature of about 400°–700° F. This partial decoking step is carried out until up to about 70 wt. % of the deposited coke is removed. Then the partially decoked catalyst is incorporated with the Group IV metal, preferably by impregnation. Finally, the partially decoked, Group IV metal-containing catalyst is subjected to a combustion step of 600°–1400° F. to remove a substantial amount of the coke.

In addition to the Group IV metals, other metals that may be added to a molecular sieve-free hydrotreating catalyst to increase attrition resistance can be antimony, zinc, zirconia, bismuth, cadmium, indium, phosphorus and niobium. Such metals can be used alone or in combination with Group IV, Group IIA, and rare earth metals.

EXAMPLE SUMMARY

In Examples 1 and 2, the denitrogenation, desulfurization, Ramscarbon removal, and devanadation activities of tin-containing catalysts were compared to those of tin-free catalysts. In Example 1, the tin-containing catalyst was a fresh NiMo desulfurization catalyst that had been impregnated with a tin-containing solution. This tin-containing catalyst was compared to a fresh, tin-free NiMo desulfurization catalyst. In Example 2, the tin-containing catalyst was prepared using the partially decoked embodiment of the regeneration process of the present invention. Both Examples 1 and 2 support the conclusion that the presence of tin on a resid hydroprocessing catalyst does not significantly impair the activities of the catalyst.

In Examples 3 and 4, the focus shifts to whether the presence of tin and titanium effect the attrition resistance and surface area retention properties of the catalyst. In both of these Examples, the catalyst is prepared using the partially decoked embodiment of the regeneration process of the present invention. Each one of these Examples support the conclusion that the presence of tin or titanium during regeneration enhances the attrition resistance and surface area retention properties of the catalyst.

EXAMPLE 1

The purpose of Example 1 was to determine whether there are any effects of tin on a fresh resid hydroprocessing catalyst activity. In Example 1, a fresh, tin-free NiMo resid desulfurization catalyst (control) was compared to a fresh, tin-containing NiMo resid desulfurization catalyst (test) with respect to denitrogenation, desulfurization, Ramscarbon removal, and devanadation activities.

The experiments were conducted using two fixed-bed, upflow reactors (⅝ inches I.D.) operated in parallel and contained in a common sand-bath heater. Reactor 1 was separated into three beds to simulate a three-stage resid hydrotreater. In the first bed, 13 cc of an equilibrium resid demetallation CoMo catalyst, designated as Catalyst 1A and having the physical properties set out below in Table I, was loaded.

TABLE I

PHYSICAL PROPERTIES OF CATALYST 1A
Composition, Wt. % Fresh Catalyst Basis, Al-Tie Point Method

| | |
|---|---|
| Ni | 3.26 |
| V | 7.52 |
| Fe | 1.09 |
| Co | 1.79 |
| Mo | 6.75 |
| Na | 3.26 |
| Si | 1.52 |
| Al (Fresh Basis) | 50.3 |
| Al (Spent Basis) | 22.2 |
| C | 69.6 |
| H | 2.99 |
| N | <0.1 |
| S | 15.3 |

The purpose of the first bed was to serve as a guard bed that removes most of the metals from the feed and maintain a relatively constant feed composition going into the second and third beds. In the second and third beds of Reactor 1, 27 cc of the control catalyst, designated as Catalyst 1B and having the physical properties set out below in Table II, was loaded.

TABLE II

PHYSICAL PROPERTIES OF CATALYSTS 1B AND 1C

| | Catalyst 1B Fresh Sn-Free | Catalyst 1C Fresh Tin-Containing Invention |
|---|---|---|
| NiO | 3.4 | 3.4 |
| MoO₃ | 13.8 | 13.8 |
| SO₄ | 0.18 | 0.18 |
| Na₂O | 0.05 | 0.05 |
| SiO₂ | 0.07 | 0.07 |
| Sn | — | 2.0 |
| Fe | 0.01 | 0.01 |
| *Porosity* | | |
| N₂ Desorption BET Surface Area, m²/g | 299 | 299 |
| Pore Volume <1200 Å (BJH), cc/g | 0.590 | 0.590 |
| Average Mesopore Diameter (4v/A), Å | 79. | 79.9 |
| Hg Porosimetry Pore Volume >1200 Å, cc/g | 0.186 | 0.186 |
| *Physical Properties* | | |
| Bulk Density, #/ft₃ | 34.7 | 34.7 |
| Dry Attrition, wt. % | 1.5 | 1.5 |

Reactor 2 was also separated into three beds. In the first bed, 13 cc of Catalyst 1A was loaded. In the second and third beds of Reactor 2, 27 cc of the test catalyst, designated as Catalyst 1C, was loaded. Catalyst 1C was prepared by impregnating Catalyst 1B with solution consisting of tin (II) 2-ethyl hexanoate dissolved in ethanol to achieve a tin concentration on the catalyst of about 2.0 wt. % based on the weight of the fresh catalyst. The impregnated catalyst was then dried overnight in an air-purged convection oven and calcined 2 hours at 900° F. Accordingly, Catalyst 1C had the same physical properties as Catalyst 1B, except Catalyst 1C contained in about 2.0 wt. % tin based on the weight of the fresh catalyst.

The catalyst loading for each reactor was diluted with 13 and 27 cc of non-porous alpha-alumina for beds 1 and beds 2 and 3 respectively, in order to achieve a thermal-to-catalytic ratio of about 1. The thermal-to-catalytic ratio for a particular reactor was calculated as follows:

$$T/C = \frac{V(\text{thermal}) - V(\text{load}) + V(\text{interstitial}) + V(\text{pore}) - V(\text{gas})}{V(\text{catalyst})} \quad [1]$$

where

V (thermal) = Total internal volume of reactor in the thermal zone

V(load) = Settled volume of catalyst charge or load, including diluent

V(interstitial) = Interstitial liquid volume between particles in the catalyst charge = $\epsilon$·(load)

V(pore) = Liquid volume in equilibrium catalyst pores

V(gas) = Volume in reactor due to gas holdup

The feed run through Reactors 1 and 2 in the present Example had the physical properties shown below in Table III.

TABLE III

| FEED PROPERTIES | |
|---|---|
| Total Feed: | |
| Gravity, °API | 7.7 |
| SG 60/60 | 1.017 |
| Ni, pp | 40 |
| V, ppm | 170 |
| Fe, ppm | 4 |
| S, Wt. % | 2.68 |
| N, Wt. % | 0.449 |
| O, Wt. % | 0.44 |
| C, Wt. % | 86.01 |
| H, Wt. % | 10.25 |
| Ramscarbon, Wt. % | 13.3 |
| Breakdown, Wt. % Feed (Vol % Feed): | |
| 360–650° F. | 7.3 (8.1) |
| 650–1000° F. | 27.5 (28.0) |
| 1000° F.+ | 65.2 (63.9) |
| 1000° F.+: | |
| Gravity, °API | 5.0 |
| Sulfur, Wt. % | 3.60 |
| Nitrogen, Wt. % | 0.614 |
| Ramscarbon, Wt. % | 20.3 |
| Ni, ppm | 66 |
| V, ppm | 267 |
| Fe, ppm | 4 |
| Oils, Wt. % 1000° F.+ | 22.0 |
| Resins, WT. % 1000° F.+ | 66.4 |
| Asphaltenes, Wt. % 1000° F.+ | 11.6 |

Process conditions used in Example 1 included a temperature of about 790° F., a pressure of 2000 psig, and a liquid hourly space velocity of about 0.3.

In Example 1, Catalysts 1B and 1C were tested for desulfurization, Ramscarbon removal, denitrogenation and devanadation activities. These activities were calculated using the expressions shown immediately below.

Desulfurization activity assuming pseudo-second order reaction with an activation energy of 83,000 Btu/lb-mol was calculated in accordance with the following equation:

$$A_S = \frac{\left[\frac{1}{S_P \times .93} - \frac{1}{S_F}\right] \times LHSV}{k_S \times P \times e^{-E/RT}}$$

where:

$A_S$ is desulfurization activity $K_S$ is pre-exponential feed sulfur factor (1420 × 10$^6$ hr$^{-1}$ psig$^{-1}$/wt. %)

$S_P$ is product sulfur content, wt. %

P is total pressure, psig $S_F$ is feed sulfur content, wt. %

T is absolute average temperature, °R

E is activation energy, 83,300 Btu/lb-mol

LHSV is liquid (volumetric) hourly space velocity, hr$^{-1}$.

Ramscarbon removal activity assuming pseudo-second order kinetics with an activation energy of 83,300 BTU/lb-mol was calculated in accordance with the following equation:

$$A_r = \frac{\left[\frac{1}{R_P \times .93} - \frac{1}{R_F}\right] \times LHSV}{k_r \times P \times e^{-E/RT}}$$

where:

$A_r$ is ramscarbon removal activity $k_r$ is pre-exponential feed Ramscarbon factor (103 × 10$^6$ hr$^{-1}$ psig$^{-1}$/wt. %)

$R_P$ is product ramscarbon content, wt. %

$R_F$ is feed ramscarbon content, wt. %

P is total pressure, psig

T is absolute average temperature, °R

E is activation energy, 83,000 Btu/lb-mol

LHSV is liquid (volumetric) hourly space velocity, hr$^{-1}$.

Denitrogenation activity was calculated assuming pseudo-first-order kinetics with an activation energy of 45,400 Btu/lb-mol in accordance with the following equation:

$$A_N = \frac{-\left[\ln\left[\frac{N_P \times .93}{N_F}\right]\right] \times LHSV}{K_N \times P \times e^{-E/RT}}$$

where:

$A_N$ is HDN activity $N_F$ is feed nitrogen content, ppm $N_P$ is product nitrogen content, ppm LHSV is liquid (volumetric) hourly space velocity, hr$^{-1}$ $K_N$ is pre-exponential feed nitrogen factor = 92 hr$^{-1}$ psig$^{-1}$ P is total pressure, psig E is activation energy 45,400 Btu/lb-mol T is absolute average temperature, °R.

Devanadation activity was calculated on the basis of the following first-order rate equation, where the activation energy was 83,300 Btu/lb-mol:

$$A_V = \frac{-\left[\ln\left[\frac{V_P \times .93}{V_F}\right]\right] \times LHSV}{K_V \times P \times e^{-E/RT}}$$

where:

$A_V$ is devanadation activity $V_P$ is product vanadium content, ppm $V_F$ is feed vanadium content, ppm $K_V$ is pre-exponential feed vanadium factor (2730 × 10$^6$ hr$^{-1}$ psig$^{-1}$)

P is total pressure, psig

T is absolute average temperature, °R
E is activation energy, 83,300 Btu/lb-mol
LHSV is liquid (volumetric) hourly space velocity, hr$^{-1}$.

FIGS. 1-4 show that the fresh, tin-containing catalyst (Catalyst 1C) possessed denitrogenenation, desulfurization, Ramscarbon removal, and devanadation activities comparable to those of the fresh, tin-free catalyst (Catalyst 1B). In other words the presence of tin does not impair the activity of the fresh catalyst.

EXAMPLE 2

In the present Example, a fresh resid hydrodemetallation catalyst was compared with an invention regenerated hydrodesulfurization catalyst. The fresh resid hydrometallation catalyst was designated as Catalyst 2A and had the physical properties shown in Table IV. Catalyst 2A was a commercially available catalyst that is typically used in the first stage of a three-stage resid hydrotreating unit. The catalyst employed in the relative upstream region should possess relatively higher hydrodemetallation and Ramscarbon removal activities since the rate of hydrodenitrogenation and hydrodesulfurization increases further downstream in the reactor. Thus, at a minimum, any catalyst regenerated by the process of the present invention should possess the demetallation and Ramscarbon removal activities of a fresh hydrodemetallation (HDM) catalyst used in the first stage of the reactor especially since the regenerated catalyst will generally be introduced into the first stage of the reactor. Accordingly, this Example compares a fresh HDM catalyst to a catalyst regenerated using the present invention under simulated first stage conditions.

The invention regenerated catalyst is denoted as Catalyst 2D, and had the properties set out below in Table IV. The invention regenerated catalyst started out as a fresh hydrodesulfurization catalyst denoted as Catalyst 2B and having the physical properties set out below in Table IV. This fresh catalyst was then contacted with a resid hydrocarbon feedstock at reaction conditions in a commerical resid hydroprocessing unit thereby resulting in a spent catalyst denoted as Catalyst 2C and having the physical properties set out below in Table IV. Prior to regeneration, Catalyst 2C was washed with toluene and hexane to strip off excess oil and dried overnight in a nitrogen-purged convection oven at 250° F. Catalyst 2C was first subjected to a partial decoking step in the presence of air. Specifically, a large muffle furnace was employed wherein the temperature was increased from 300°–600° F. at 100° F. per hour increments and then held at 600° F. for 1 hour. This partial decoking step removed about 50 percent of the deposited coke and increased the pore volume from about 0.1 to about 0.4 cc/g. The partially decoked catalyst was then impregnated with Sn(II) 2-ethyl hexanoate dissolved in ethanol to achieve a level of 3.77 wt.% Sn on the catalyst based on the fresh catalyst weight. The impregnated catalyst was then dried overnight in an air-purged convection oven. A final decoking or coke burning step was carried out in the presence of air at 900° F. for about 2 hours after carrying out a temperature increase procedure from about 300°–900° F. wherein the temperature was increased approximately 100° F. per hour. The result was Catalyst 2D, a tin-containing hydrodesulfurization catalyst regenerated using the present invention.

TABLE IV

|  | 2A Fresh HDM Control | 2B Fresh HDS Control | 2C Equilibrium HDS Control | 2D Sn + Decoked Equilibrium HDS Invention |
|---|---|---|---|---|
| Chemical Analysis (wt. % fresh Basis) | | | | |
| Ni | — | — | 1.64 | 1.43 |
| V | — | — | 6.09 | 5.36 |
| Fe | — | — | 1.15 | 0.72 |
| Na | 0.03 | 0.03 | 0.26 | 0.17 |
| Si | 1.01 | — | 0.21 | 0.20 |
| CoO | 0.55 | 3.51 | 3.51 | 2.91 |
| MoO$_3$ | 3.81 | 13.6 | 15.4 | 13.8 |
| Sn | — | — | — | 3.77 |
| C | — | — | 54.10 | <0.1 |
| H | — | — | 2.51 | — |
| S | 0.12 | 0.10 | 0.02 | 1.79 |
| Al (fresh basis) | (50.3) | (43.6) | — | (43.6) |
| Al (spent/decoked basis) | — | — | 25 | 35 |
| Porosity (fresh basis) | | | | |
| BET Surface Area m$^2$/g | 194 | 300 | 195 | 256 |
| Pv, 1200 Å−, cc/g | 0.80 | 0.63 | 0.073 | 0.60 |
| Avg. meso pore Diameter (4V/A), Å | 165 | 84 | 158 | 94 |
| Pv, 1200 Å+, cc/g (Mercury Porosimetry) | 0.25 | 0.20 | 0.21 | 0.33 |

Activity testing of the tin-free, fresh demetallation catalyst (Catalyst 2A) and the tin-containing catalyst (Catalyst 2D) regenerated using the present invention was carried out in two separate runs using two single stage reactors in series. Even though there were two reactors, this Example simulated a first stage of a commercial resid hydrotreater because both reactors were filled with either the fresh tin-free, demetallation catalyst (Catalyst 2A) or the tin-containing catalyst regenerated using the present invention (Catalyst 2D). A typical reactor loading consisted of the first reactor containing 13 cc of catalyst and 16 cc of non-porous alpha-alumina chips and the second reactor containing 7 cc of catalyst and 8 cc of the alumina chips. The reactor catalyst loadings, like Example 1, were diluted with non-porous alumina chips to achieve a thermal-to-catalytic ratio of about 1. Process conditions used were the same as those in Example 1 except the liquid hourly space velocity was 0.6 LHSV. The feedstock used in Example 2 was the same as that used in Example 1. (See Table III).

FIGS. 5-8 depict denitrogenation activity, desulfurization activity, Ramscarbon removal activity, and devanadation activity, respectively versus percentage accumulation of nickel plus vanadium upon the catalyst for Catalysts 2A and 2D. These activities were calculated using the formulas outlined in Example 1. FIGS. 5-8 clearly show that all of the initial activities of the tin-containing, regenerated catalyst (Catalyst 2D) were equal to or exceed the activities of the fresh, tin-free hydrodemetallation catalyst (Catalyst 2A).

EXAMPLE 3

The present example serves to show the improvement afforded by the invention regeneration process with respect to catalyst attrition resistance in the presence of tin.

The catalyst used in this example are listed below in Table V along with their corresponding physical properties. Catalyst 3A was prepared in the following manner. Catalyst 2C of Example 2 was washed with toluene and hexane to strip off excess oil and dried overnight in a nitrogen-purged convection oven at 250° F. Next the catalyst was fully decoked in the presence of air at 900° F. for about 2 hours after carrying out a temperature increase procedure from about 300°–900° F. wherein the temperature was increased approximately 100° F. per hour. Catalyst 3B was prepared in the same manner as Catalyst 3A, except the decoking temperature was 1200° F. Catalyst 3C was prepared by first washing Catalyst 2C of Example 2 with toluene and hexane to strip off excess oil and dried overnight in a nitrogen-purged convection oven at 250° F. The catalyst was then partially decoked at 600° F. followed by impregnation with Sn (11) 2-ethyl hexanoate dissolved in ethanol to achieve a level of 3.77 wt. % Sn based on the fresh catalyst weight. The impregnated catalyst was then dried overnight in an air-purged convection oven at 250° F. The final decoking step was carried out in the presence of air at 900° F. for about 2 hours after carrying out a temperature increase procedure from 300°–900° F. wherein the temperature was increased approximately 100° F. per hour. Catalyst 3D was prepared in the same manner as Catalyst 3C, except it was finally decoked at 1200° F. instead of 900° F.

TABLE V

|  | 3A Decoked 900° F. Equilibrium HDS Control | 3B Decoked 1200° F. Equilibrium HDS Control | 3C Sn + Decoked 900° F. Equilibrium HDS Invention | 3D Sn + Decoked 1200° F. Equilibrium HDS Invention |
|---|---|---|---|---|
| Chemical Analysis (wt. % fresh Basis) | | | | |
| Ni | 1.61 | 1.57 | 1.43 | 1.15 |
| V | 5.04 | 5.90 | 5.36 | 5.30 |
| Fe | 0.75 | 0.85 | 0.72 | 0.58 |
| Na | 0.19 | 0.20 | 0.17 | 0.14 |
| Si | 0.10 | 0.25 | 0.20 | 0.17 |
| CoO | 3.36 | 3.71 | 2.91 | 2.39 |
| MoO3 | 14.8 | 15.5 | 13.8 | 13.8 |
| Sn | — | — | 3.77 | 3.77 |
| C | <0.1 | <0.1 | <0.1 | <0.1 |
| H | 0.30 | 0.21 | — | — |
| S | 2.52 | 0.47 | 1.79 | 0.38 |
| Al (fresh basis) | (43.6) | (43.6) | (43.6) | (43.6) |
| Al (spent/decoked basis) | 30.8 | 35.8 | 35 | 43 |
| Porosity (fresh basis) | | | | |
| BET Surface Area m²/g | 281 | 137 | 256 | 188 |
| Pv, 1200 Å-, cc/g | 0.76 | 0.56 | 0.6 | 0.48 |
| Avg. meso pore Diameter (4V/A), Å | 108 | 163 | 94 | 102 |
| Pv, 1200 Å+, cc/g (Mercury Porosimetry) | 0.328 | 0.29 | 0.33 | 0.203 |

Each catalyst sample was passed over a U.S. 30 mesh size sieve to remove fines. Subsequently, each sample was calcined for 1 hour at 900° F. in a nitrogen-purged oven at 6.8 SCFH using a wire mesh basket. The sample was then cooled to room temperature in a desiccator. Each sample was then placed in an abrasion test drum as described in ASTM method 04058. Also loaded into the drum was a 1 ml. vial of Darco G-60 activated carbon powder (100–325 mesh) to control any static electricity charge build-up.

Prior to loading, the activated carbon was dried in nitrogen (0.34 SCFH) at 750° F. for 1 hour. The total weight of added carbon was about 0.4 to about 0.5 g. The drum was then rotated at 60 rpm for 22 hours. After rotation, each sample was screened over a 30 mesh sieve. The screened samples were then put into an air-purged oven at 600° F. The temperature was then increased to 900° F. and then held there for at least 1 hour. The oven was then cooled to 800° F. Each sample was then weighed, and the weight w(a) recorded.

The loss on attrition (LOA) was then calculated for each sample in accordance with the following formula:

$$LOA = \frac{[w(b) - w(a)]}{w(b)} \times 100$$

Figure 9:
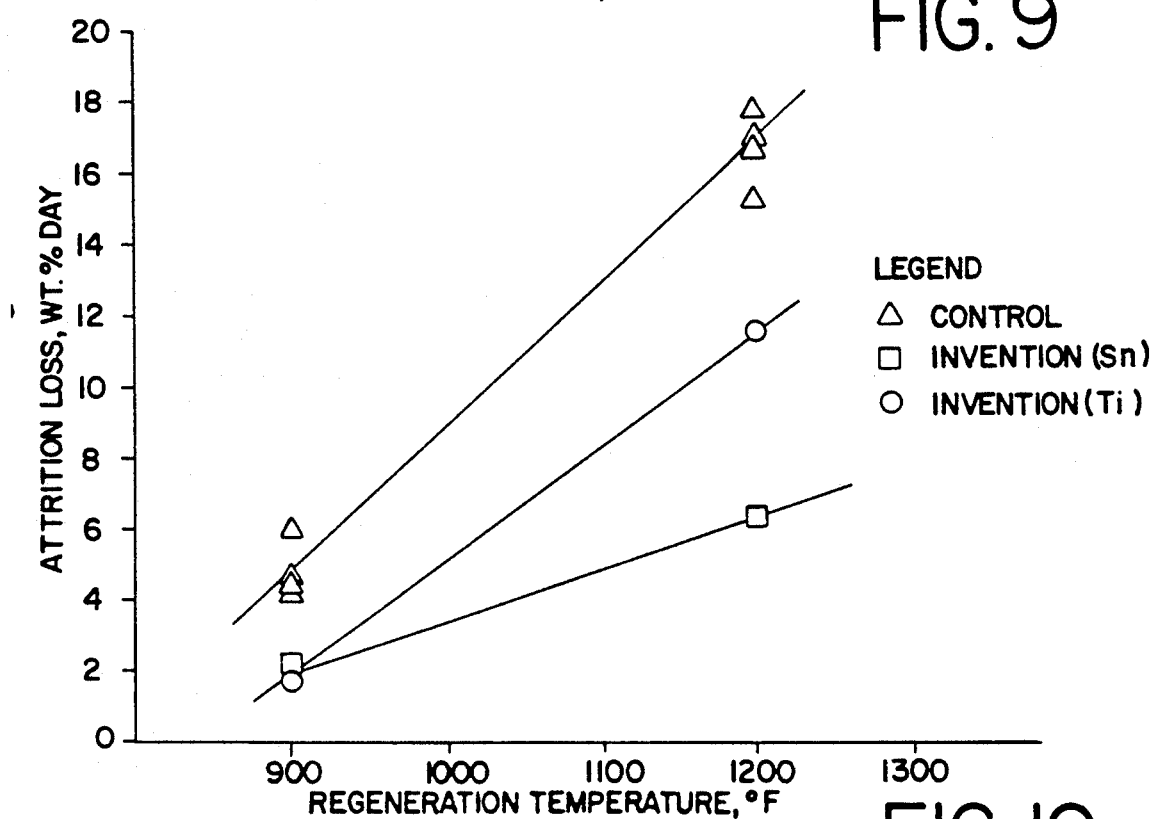
FIG. 9 depicts a plot of dry attrition loss, weight percent per day, versus regeneration temperature for comparative catalysts and for invention catalysts tested in Example 3 and 4.

The results of the attrition test is shown in FIG. 9. As shown, at regeneration temperatures of both 900° F. and 1200° F., the tin-treated catalysts (Catalysts 3C and 3D) had a lower attrition loss than the non-treated catalyst.

Figure 10:
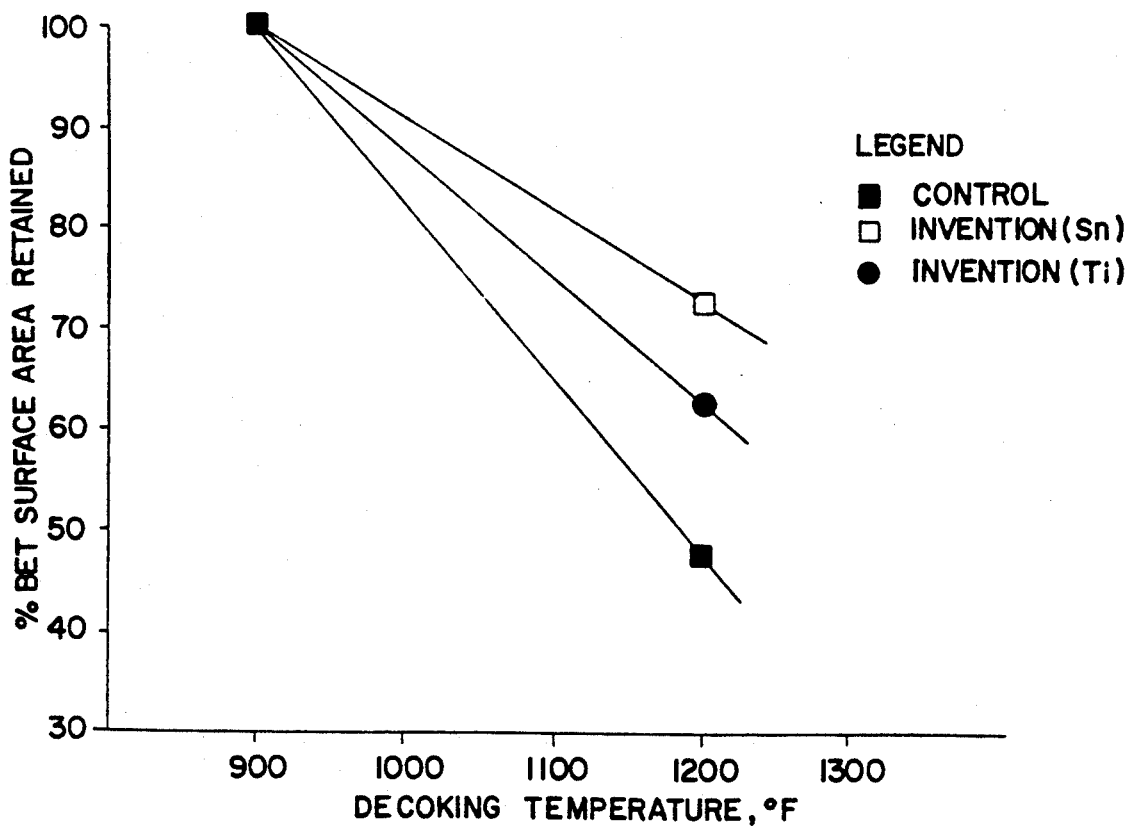
FIG. 10 depicts a plot of surface area retained versus regeneration temperature for comparative catalysts and for invention catalysts tested in Examples 3 and 4.

To further confirm the beneficial effects of catalyst regenerated using the present invention, as shown in FIG. 10, the tin-treated catalysts (Catalysts 3C and 3D) retained a greater percentage of their surface area than the tin-free catalysts (Catalysts 3A and 3B).

EXAMPLE 4

The present example serves to show the improvement afforded by the invention regeneration process with respect to catalyst attrition resistance in the presence of titanium.

The catalysts used in this example are listed below in Table VI along with their corresponding physical properties. Catalysts 3A and 3B are the same as those used in Example 3. Catalyst 4A was prepared by first washing Catalyst 2C of Example 2 with toluene and hexane to strip off excess oil and dried overnight in a nitrogen-purged convection oven at 250° F. The catalyst was then partially decoked at 600° F. followed by impregnation with titanium (disopropoxide) bis (2,4-pentanedionate) dissolved in isopropanol to achieve a level of 3.53 wt. % titanium on the catalyst based on the fresh catalyst weight. The final decoking step was carried out in the presence of air at 900° F. for about 2 hours after carrying out a temperature increase procedre from 300°–900° F. wherein the temperature was increased approximately 100° F. per hour. Catalyst 4B was prepared in the same manner as Catalyst 4A, except it was finally decoked at 1200° F.

TABLE VI

|  | 3A Decoked 900° F. Equilibrium HDS Control | 3B Decoked 1200° F. Equilibrium HDS Control | 4A Ti Decoked 900° F. Equilibrium HDS Invention | 4B Ti + Decoked 1200° F. Equilibrium HDS Invention |
|---|---|---|---|---|
| Chemical Analysis (wt. % fresh Basis) | | | | |
| Ni | 1.61 | 1.57 | 1.44 | 1.40 |
| V | 5.04 | 5.90 | 5.27 | 5.13 |
| Fe | 0.75 | 0.85 | 0.72 | 0.72 |
| Na | 0.19 | 0.20 | 0.16 | 0.15 |
| Si | 0.10 | 0.25 | 0.21 | 0.21 |
| CoO | 3.36 | 3.71 | 3.07 | 2.92 |

TABLE VI-continued

|  | 3A Decoked 900° F. Equilibrium HDS Control | 3B Decoked 1200° F. Equilibrium HDS Control | 4A Ti Decoked 900° F. Equilibrium HDS Invention | 4B Ti + Decoked 1200° F. Equilibrium HDS Invention |
|---|---|---|---|---|
| $MoO_3$ | 14.8 | 15.5 | 14.3 | 13.6 |
| Ti | — | — | 3.53 | 3.53 |
| C | <0.1 | <0.1 | <0.1 | <0.1 |
| H | 0.30 | 0.21 | — | — |
| S | 2.52 | 0.47 | 1.79 | 0.28 |
| Al (fresh basis) | (43.6) | (43.6) | (43.6) | (43.6) |
| Al (spent/decoked basis) | 30.8 | 35.8 | 35.0 | 35.7 |
| Porosity (fresh basis) | — | — |  |  |
| BET Surface Area $m^2/g$ | 281 | 137 | 256 | 173 |
| Pv, 1200 Å-, cc/g | 0.76 | 0.56 | 0.6 | 0.54 |
| Avg. meso pore Diameter (4V/A), Å | 108 | 163 | 94 | 125 |
| Pv, 1200 Å+, cc/g (Mercury Porosimetry) | 0.328 | 0.29 | 0.33 | 0.26 |

As in Example 3, attrition tests and surface area Retention tests were run. FIG. 9 show that the titanium-containing catalysts (Catalysts 4A and 4B) regenerated using the present invention had a lower attrition loss than the titanium-free catalysts, (Catalysts 3A and 3B). FIG. 10 shows that the titanium-containing catalysts also retained a greater percentage of their surface area in comparison to the non-treated catalysts.

That which is claimed is:

1. A method for regenerating a contaminant metal-containing, resid hydroprocessing molecular sieve-free catalyst for use with an ebullated bed reaction process wherein said catalyst contains a pore volume of pores having a diameter greater than 1200 Angstroms of at least 0.05 cc/gm, comprising the steps of:
    (a) partially decoking said catalyst in an initial coke-burning step wherein said catalyst is contacted with an oxygen-containing gas at a temperature ranging from about 400° F. to about 700° F.;
    (b) incorporating a Group IV metal onto said partially decoked catalyst such that the partially decoked catalyst contains about 0.1 to about 20.0 wt % of said Group IV metal calculated as the oxide and based on the fresh weight of said catalyst; and
    (c) decoking said partially decoked, Group IV metal-containing catalyst in a final coke-burning step wherein said catalyst is contacted with an oxygen-containing gas at a temperature ranging from about 600° F. to about 1400° F., thereby removing a substantial amount of said coke,
    wherein the loss on attrition of said resid hydroprocessing molecular sieve-free catalyst after step (c) is less than 9 weight percent fines per day calculated based on a regeneration temperature of 1000° F.

2. The method of claim 1 wherein said contaminant metal is at least one member selected from the group consisting of V, Ni, and Fe.

3. The method of claim 2 wherein the concentration of V and Ni combined is at least 4 percent by weight, calculated based on the fresh catalyst weight.

4. The method of claim 1 wherein said resid hydroprocessing molecular sieve-free catalyst comprises a hydrogenation metal selected from the group consisting of Fe, Ru, Os, Co, Ir, Ni, Pd, Pt, Mo, W, and Cr.

5. The method of claim 1 wherin said hydrogenation metals are Co and Mo.

6. The method of claim 1 wherein said hydrogenation metals are Ni and Mo.

7. A method of claim 1 wherein said Group IV metal is at least one member selected from the group consisting of Ge, Sn, Pb, Ti, Zr and Hf.

8. The method of claim 1, wherein said Group IV metal is Ti.

9. The method of claim 1 wherein said Group IV metal is Sn.

* * * * *